United States Patent
Zhou et al.

(10) Patent No.: US 8,213,196 B2
(45) Date of Patent: Jul. 3, 2012

(54) POWER SUPPLY CIRCUIT WITH PROTECTING CIRCUIT HAVING SWITCH ELEMENT FOR PROTECTING PULSE WIDTH MODULATION CIRCUIT

(75) Inventors: He-Kang Zhou, Shenzhen (CN); Tong Zhou, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 692 days.

(21) Appl. No.: 12/317,865

(22) Filed: Dec. 29, 2008

(65) Prior Publication Data

US 2009/0168465 A1    Jul. 2, 2009

(30) Foreign Application Priority Data

Dec. 29, 2007    (CN) .......................... 2007 1 0125670

(51) Int. Cl.
*H02H 7/122*    (2006.01)
(52) U.S. Cl. ..................................... 363/56.09; 323/908
(58) Field of Classification Search .... 363/21.07–21.11, 363/21.14–21.18, 55, 56.01, 56.09–56.12; 323/908; 361/91.1, 91.2, 91.5, 93.9
See application file for complete search history.

(56) References Cited

U.S. PATENT DOCUMENTS

| 5,917,716 A | 6/1999 | Cho | |
|---|---|---|---|
| 6,005,781 A * | 12/1999 | Balakirshnan | 363/21.18 |
| 6,958,920 B2 * | 10/2005 | Mednik et al. | 363/19 |
| 7,031,128 B2 | 4/2006 | Nam | |
| 2001/0026429 A1 * | 10/2001 | Fukuda et al. | 361/93.9 |
| 2003/0048645 A1 * | 3/2003 | Hosotani et al. | 363/21.12 |
| 2003/0174528 A1 * | 9/2003 | Wong et al. | 363/147 |
| 2004/0042239 A1 * | 3/2004 | Kitano | 363/49 |
| 2005/0052886 A1 * | 3/2005 | Yang et al. | 363/49 |
| 2006/0220623 A1 * | 10/2006 | Andruzzi et al. | 323/276 |

FOREIGN PATENT DOCUMENTS

JP    10-28374 A    1/1998

* cited by examiner

*Primary Examiner* — Gary L Laxton
*Assistant Examiner* — Gustavo Rosario Benitez
(74) *Attorney, Agent, or Firm* — WPAT, P.C.; Justin King

(57) ABSTRACT

A power supply circuit includes a direct current (DC) voltage source, a protecting circuit having a first switching element, a pulse width modulation (PWM) circuit having a first terminal, a switching circuit, and a transformer. The DC voltage source is configured to provide a first DC voltage. The first terminal is configured to receive the first DC voltage via the first switching element to enable the PWM circuit. The PWM circuit is configured to switch on or switch off the switching circuit. The transformer is configured to convert the first DC voltage to an alternating current (AC) voltage in cooperation with the switching circuit.

17 Claims, 2 Drawing Sheets

POWER SUPPLY CIRCUIT WITH PROTECTING CIRCUIT HAVING SWITCH ELEMENT FOR PROTECTING PULSE WIDTH MODULATION CIRCUIT

FIELD OF THE INVENTION

The present invention relates to a power supply circuit, and more particularly to a power supply circuit with a protecting circuit.

GENERAL BACKGROUND

Power supply circuits have the advantages of low weight, small size, low power consumption; and have been widely used in various electronic devices, such as liquid crystal display (LCD) monitors and televisions.

A typical power supply circuit includes a bridge rectifier circuit for converting an external alternating current (AC) voltage to a high level direct current (DC) voltage, a filter circuit for filtering the high level DC voltage to a stable DC voltage, and an inverter circuit for converting the stable DC voltage to a desired low level AC voltage. In order to maintain the stable DC voltage, the filter circuit generally needs a filter capacitor with large capacity.

When an electronic device using the power supply circuit is powered off, the power supply circuit is turned off. Due to its large capacity, the filter capacitor may store a large quantity of electric energy. This may cause the inverter circuit to work in an abnormal state after the power supply circuit is turned off. As a result, the inverter circuit may be damaged or completely broken. Thus the reliability of the power supply circuit is somewhat low.

What is needed is to provide a power supply circuit that can overcome the above-described deficiencies.

SUMMARY

An aspect of the disclosure relates to a power supply circuit including a DC voltage source, a protecting circuit having a first switching element, a PWM circuit having a first terminal, a switching circuit, and a transformer. The DC voltage source is configured to provide a first DC voltage. The first terminal is configured to receive the first DC voltage via the first switching element to enable the PWM circuit. The PWM circuit is configured to switch on or switch off the switching circuit. The transformer is configured to convert the first DC voltage to an AC voltage in cooperation with the switching circuit.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION OF PREFERRED EMBODIMENTS

Reference will now be made to the drawings to describe exemplary embodiments of the present invention in detail.

Figure 1:
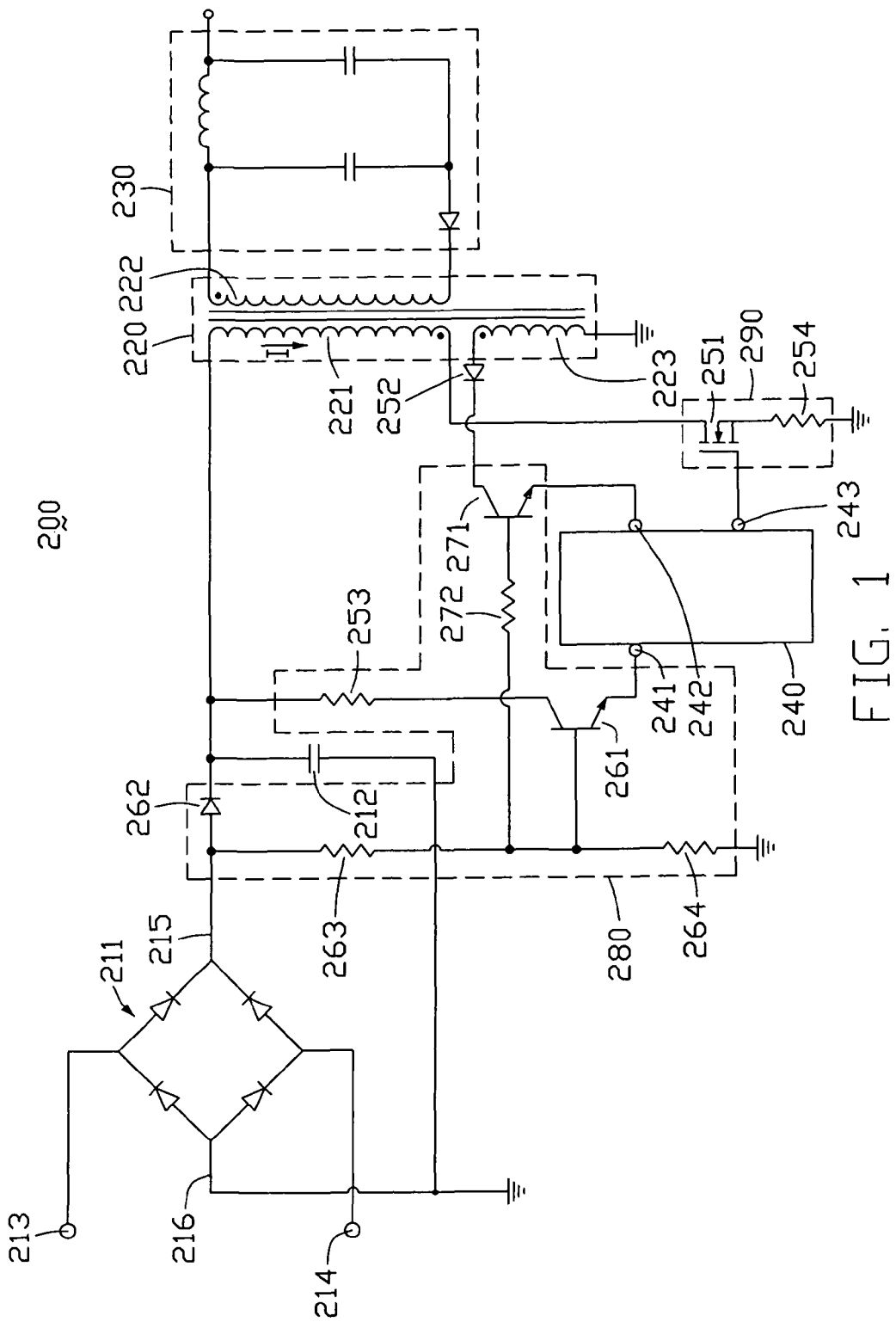
FIG. 1 is a diagram of a power supply circuit according to a first embodiment of the present invention.

FIG. 1 is a diagram of a power supply circuit 200 according to a first embodiment of the present invention. The power supply circuit 200 can be employed to provide power for an electronic device, such as an LCD. The power supply circuit 200 includes a full bridge rectifier circuit 211, a filter capacitor 212, a transformer 220, a rectifier and filter circuit 230, a PWM circuit 240, a rectifying diode 252, a protecting circuit 280, and a switching circuit 290.

The protecting circuit 280 includes a first transistor 261, a second transistor 271, a diode 262, a first current-limiting resistor 253, a first bias resistor 264, a second bias resistor 263, and a third bias resistor 272. The switching circuit 290 includes a third transistor 251 and a second current-limiting resistor 254. Each of the first transistor 261 and the second transistor 271 is a negative-positive-negative (NPN) type bipolar junction transistor (BJT). The third transistor 251 is a n-channel metal oxide semiconductor field effect transistor (MOSFET).

The full bridge rectifier circuit 211 is configured for converting an external AC voltage to a primary DC voltage, and the filter capacitor 212 is configured for converting the primary DC voltage to a stable DC voltage. The full bridge rectifier circuit 211 includes two input terminals 213 and 214, a positive output terminal 215, and a negative output terminal 216. The two input terminals 213 and 214 are used to receive the external AC voltage. The positive output terminal 215 is connected to one end of the filter capacitor 212 via an anode and a cathode of the diode 262 in series. The negative output terminal 216 and the other end of the filter capacitor 212 are grounded. The filter capacitor 212 can be an electrolytic capacitor.

The transformer 220 includes a first winding 221, a second winding 222, and a third winding 223. One end of the first winding 221 is connected to the cathode of the first diode 262 for receiving the stable DC voltage, and the other end of the first winding 221 is grounded via a drain electrode and a source electrode of the third transistor 251 and the second current-limiting resistor 254 in series. The second winding 222 is connected to the rectifier and filter circuit 230. One end of the third winding 223 is grounded, and the other end of the third winding 223 is connected to the PWM circuit 240 via an anode and a cathode of the rectifying diode 252 and the second transistor 271 in series.

The PWM circuit 240 includes a first terminal 241 receiving the stable DC voltage for enabling the PWM circuit 240, a second terminal 242 receiving a power voltage signal for working, and a controlling terminal 243 outputting a pulse signal to switch on or switch off the switching circuit 290. The first terminal 241 is connected to the anode of the diode 262 via an emitter electrode and a collector electrode of the first transistor 261 and the first current-limiting resistor 253 in series. The second terminal 242 is connected to the cathode of the rectifying diode 252 via the emitter electrode and the collector electrode of the second transistor 271. The controlling terminal 243 is connected to a gate electrode of the third transistor 251. The anode of the first diode 262 is grounded via the first bias resistor 264 and the second bias resistor 263 in series. A base electrode of the first transistor 261 is connected to a node between the first bias resistor 264 and the second bias resistor 263. A base electrode of the second transistor 271 is connected to the node between the first bias resistor 264 and the second bias resistor 263 via the third bias resistor 272.

Typical operation of the power supply circuit 200 is as follows. An external AC voltage is provided to the bridge rectifier circuit 211 and is converted into a primary DC voltage. The primary DC voltage is then provided to the filter capacitor 212 via the diode 262 and is converted to a stable DC voltage. The primary DC voltage is also provided to the base electrode of the first transistor 261 via the second bias resistor 263, and to the base electrode of the second transistor 271 via the second bias resistor 263 and the third bias resistor 272 in series. Thereby, the first transistor 261 and the second transistor 271 are both switched on. The stable DC voltage is further provided to the first winding 221 of the transformer 220; and is also provided to the first terminal 241 of the PWM circuit 240 via the first current-limiting resistor 253, the emitter electrode and the collector electrode of the first transistor 261, in series. Thereby, the PWM circuit 240 is enabled and outputs a pulse signal via the controlling terminal 243 so as to switch on or switch off the third transistor 251 of the switching circuit 290.

When the third transistor 251 is switched on, the first winding 221 is grounded via the second current-limiting resistor 254. A current I is generated and flows through the first winding 221. When the third transistor 251 is switched off, the current I decreases. The first winding 221 generates a variable magnetic field during the transition from the switching on to the switching off of the third transistor 251, and during the transition from the switching off to the switching on of the third transistor 251.

Due to the variable magnetic field, the second winding 222 and the third winding 223 respectively generate a first AC voltage signal and a second AC voltage signal. The first AC voltage signal is converted to a desired DC output voltage via the rectifier and filter circuit 230, and is applied to a load circuit. The second AC voltage signal is rectified by the rectifying diode 252, and is converted to an internal DC power voltage signal. The internal DC power voltage signal is then supplied to the PWM circuit 240 via the second transistor 271.

When the power supply circuit 200 is turned off, the electric energy stored in the filter capacitor 212 cannot be provide to the base electrodes of the first transistor 261 and the second transistor 271 because of the unilateral conduction characteristic of the first diode 262. Thus, the first transistor 261 and the second transistor 271 are switched off immediately, and the PWM circuit 240 is turned off correspondingly. The electric energy stored in the filter capacitor 212 is prevented from being provided to the first terminal 241 and the second terminal 242 of the PWM circuit 240, and is not released until the power supply circuit 200 is started up next time.

In summary, when the power supply circuit 200 is turned off, the first transistor 261 and the second transistor 271 of the protecting circuit 280 are switched off immediately, so that the PWM circuit 240 is turned off immediately. Thereby the reliability of the PWM circuit 240 and the power supply circuit 200 is improved. Moreover, because the electric energy stored in the filter capacitor 212 is released when the power supply circuit 200 is started up next time, the turn-on time of the PWM circuit 240 and the power supply circuit 200 is also reduced.

Figure 2:
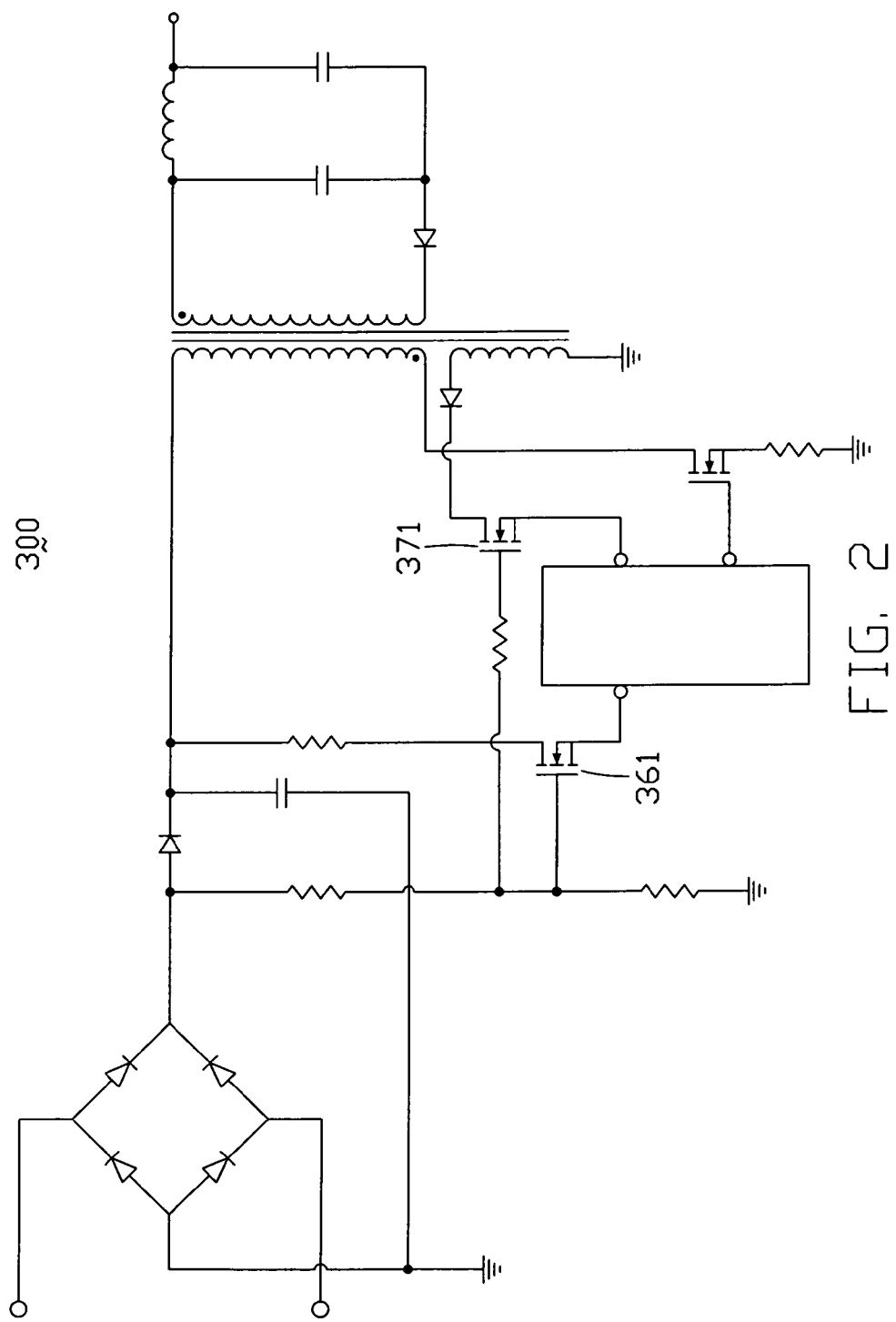
FIG. 2 is a diagram of a power supply circuit according to a second embodiment of the present invention.

FIG. 2 is a diagram of a power supply circuit 300 according to a second embodiment of the present invention. The power supply circuit 300 is similar to the above-described power supply circuit 200, differing only in that a first transistor 361 and a second transistor 371 are n-channel MOSFETs.

It is to be understood, however, that even though numerous characteristics and advantages of the present embodiments have been set out in the foregoing description, together with details of the structures and functions of the embodiments, the disclosure is illustrative only; and that changes may be made in detail, especially in matters of arrangement of parts within the principles of the disclosure to the full extent indicated by the broad general meaning of the terms in which the appended claims are expressed.

What is claimed is:

1. A power supply circuit comprising:
   a primary direct current (DC) voltage source configured for providing a primary DC voltage,
   a filter capacitor configured for converting the primary DC voltage to the first DC voltage,
   a protecting circuit comprising a first switching element, a second switching element, a first diode, a first bias resistor, and a second bias resistor, the first switching element comprising a control terminal, a first conduction terminal, and a second conduction terminal, the second switching element comprising a control terminal, a first conduction terminal, and a second conduction terminal, and
   a pulse width modulation (PWM) circuit comprising a first terminal and a second terminal, the first terminal capable of receiving the first DC voltage via the first switching element to thereby enable the PWM circuit, the second terminal capable of receiving a second DC voltage, the second DC voltage capable of being provided to the second terminal of the PWM circuit via the second switching element,
   the primary DC voltage source capable of being grounded via the first bias resistor and the second bias resistor in series, and also being connected to the controlling terminal of the first switching element and an anode of the first diode, a cathode of the first diode capable of being grounded via the filter capacitor, and also being connected to the first terminal of the PWM circuit via the first conduction terminal and the second conduction terminal of the first switching element, the controlling terminals of the first switching element and the second switching element being connected to a node between the first bias resistor and the second bias resistor, the first conduction terminal of the second switching element capable of receiving the second DC voltage, and the second conduction terminal of the second switching element being connected to the second terminal of the PWM circuit,
   wherein when the power supply circuit is turned off, the first switching element is switched off.

2. The power supply circuit of claim 1, wherein the protecting circuit further comprises a current-limiting resistor connected between the cathode of the first diode and the first conduction terminal of the first switching element.

3. The power supply circuit of claim 1, wherein the protecting circuit further comprises a third bias resistor, the controlling terminal of the second switching element being connected to the node between the first bias resistor and the second bias resistor via the third resistor.

4. The power supply circuit of claim 1, wherein the primary DC voltage source is a full bridge rectifier circuit.

5. The power supply circuit of claim 1, wherein at least one of the first switching element and the second switching element is one of a negative-positive-negative (NPN) type transistor and an n-channel metal oxide semiconductor field effect transistor (MOSFET).

6. The power supply circuit of claim 1, further comprising a transformer and a switching circuit, the transformer comprising a first winding and a second winding, the PWM circuit configured for selectively switching on or switching off the switching circuit, the first winding of the transformer capable of being grounded via the switching circuit, and the second transformer capable of outputting an alternating current (AC) voltage.

7. A power supply circuit comprising:
- a primary direct current (DC) voltage source configured for providing a primary DC voltage;
- a filter capacitor configured for converting the primary DC voltage to a first DC voltage;
- a protecting circuit comprising a first switching element and a first diode, the first diode being connected between the primary DC voltage source and the filter capacitor, an anode of the first diode being connected to the primary DC voltage source, a cathode of the first diode being grounded via the filter capacitor, the first switching element comprising a control terminal, a first conduction terminal, and a second conduction terminal, the control terminal configured for receiving the primary DC voltage, and the first switching element being switched on or switched off under the control of the primary DC voltage, the first conduction terminal connected to the filter capacitor for receiving the first DC voltage, and
- a pulse width modulation (PWM) circuit comprising a first terminal connected to the second conduction terminal, the first terminal capable of receiving the first DC voltage from the second conduction terminal to thereby enable the PWM circuit when the first switching element is switched on by the primary DC voltage,
- wherein the protecting circuit further comprises a second switching element comprising a control terminal, a first conduction terminal, and a second conduction terminal, the control terminal of the second switching element configured for receiving the primary DC voltage, the second switching element being switched on or switched off under the control of the primary DC voltage,
- wherein the PWM circuit comprises a second terminal configured to receive a second DC voltage, and when the second switching element is switched on by the primary DC voltage, the second DC voltage is provided to the second terminal of the PWM circuit via the first conduction terminal and the second conduction terminal of the second switching element.

8. The power supply circuit of claim 7, wherein the protecting circuit further comprises a first bias resistor, and a second bias resistor, the primary DC source capable of being grounded via the first bias resistor and the second bias resistor in series, and the control terminals of the first switching element and the second switching element being connected to a node between the first bias resistor and the second bias resistor and receiving the primary DC voltage via the first bias resistor.

9. The power supply circuit of claim 8, wherein the protecting circuit further comprises a third bias resistor, the control terminal of the second switching element being connected to the node between the first bias resistor and the second bias resistor via the third bias resistor and receiving the primary DC voltage via the first bias resistor and the third bias resistor.

10. The power supply circuit of claim 9, wherein the protecting circuit further comprises a current-limiting resistor connected between the cathode of the first diode and the first conduction terminal of the first switching element.

11. The power supply circuit of claim 7, wherein the primary DC voltage source is a full bridge rectifier circuit configured for converting an external AC voltage to the primary DC voltage, the full bridge rectifier circuit comprises two input terminals configured for receiving the external AC voltage, a positive output terminal and a negative output terminal, the negative output terminal capable of being grounded, the positive output terminal configured to provide the primary DC voltage.

12. The power supply circuit of claim 11, further comprising a transformer and a switching circuit, the transformer comprising a first winding and a second winding, the PWM circuit configured for selectively switching on or switching off the switching circuit, the first winding of the transformer capable of being grounded via the switching circuit, and the second transformer capable of outputting an alternating current (AC) voltage.

13. The power supply circuit of claim 12, wherein the transformer comprises a third winding, one end of the third winding being grounded, and the other end of the third winding being connected to the second terminal of the PWM circuit via an anode and a cathode of a rectifying diode, the first conduction terminal and the second conduction terminal of the second transistor in series for providing the second DC voltage.

14. A power supply circuit comprising:
- a primary direct current (DC) voltage source comprising an output terminal for outputting a primary DC voltage,
- a protecting circuit comprising a first switching element and a first diode, the first switching element comprising a control terminal, a first conduction terminal, and a second conduction terminal, the control terminal connected to the output terminal for receiving the primary DC voltage, and the first switching element being switched on or switched off under the control of the primary DC voltage,
- a filter capacitor connected to the output terminal via the first diode for receiving the primary DC voltage, and capable of converting the primary DC voltage to a first DC voltage, the first conduction terminal connected to the filter capacitor for receiving the first DC voltage, and
- a pulse width modulation (PWM) circuit comprising a first terminal, the first terminal connected to the filter capacitor via the second conduction terminal and the first conduction terminal of the first switching element, and capable of receiving the first DC voltage via the second conduction terminal and the first conduction terminal of the first switching element to enable the PWM circuit during a period of the first switching element being switched on by the control of the primary DC voltage,
- wherein the protecting circuit further comprises a second switching element comprising a control terminal, a first conduction terminal, and a second conduction terminal, the control terminal of the second switching element connected to the output terminal for receiving the primary DC voltage, the second switching element being switched on or switched off under the control of the primary DC voltage,
- wherein the power supply circuit comprises a secondary DC voltage source for outputting a second DC voltage, the PWM circuit comprises a second terminal connected to the secondary DC voltage source via the second conduction terminal and the first conduction terminal of the second switching element, and capable of receiving the second DC voltage via the second conduction terminal and the first conduction terminal of the second switching element to supply the PWM circuit during a period of the second switching element being switched on by the control of the primary DC voltage.

15. The power supply circuit of claim 14, further comprising a transformer, a switching circuit, and a rectifying diode, the transformer comprising a first winding, a second winding, and a third winding, the PWM circuit configured for selectively switching on or switching off the switching circuit, the first winding of the transformer capable of being grounded via the switching circuit, the second winding capable of outputting an alternating current (AC) voltage, one end of the third winding being grounded, and the other end of the third winding being connected to an anode of the rectifying diode, the secondary DC voltage source consisting of the third winding and the rectifying diode, and a cathode of the rectifying diode outputting the second DC voltage.

16. The power supply circuit of claim 14, wherein the protecting circuit further comprises a first bias resistor, and a second bias resistor, the output terminal of the primary DC source capable of being grounded via the first bias resistor and the second bias resistor in series, and the control terminals of the first switching element and the second switching element connected to a node between the first bias resistor and the second bias resistor, and capable of receiving the primary DC voltage via the first bias resistor.

17. The power supply circuit of claim 16, wherein the protecting circuit further comprises a third bias resistor, the control terminal of the second switching element being connected to the node between the first bias resistor and the second bias resistor via the third bias resistor and receiving the primary DC voltage via the third bias resistor and the first bias resistor.

* * * * *